US008345051B2

(12) United States Patent
Nystad et al.

(10) Patent No.: US 8,345,051 B2
(45) Date of Patent: Jan. 1, 2013

(54) PROCESSING OF 3-DIMENSIONAL GRAPHICS

(75) Inventors: Jørn Nystad, Trondheim (NO); Mario Blazevic, Trondheim (NO); Borgar Ljosland, Trondheim (NO); Edvard Sørgård, Trondheim (NO)

(73) Assignee: Arm Norway AS, Trondheim (NO)

( * ) Notice: Subject to any disclaimer, the term of this patent is extended or adjusted under 35 U.S.C. 154(b) by 1178 days.

(21) Appl. No.: 11/667,656

(22) PCT Filed: Nov. 15, 2005

(86) PCT No.: PCT/GB2005/004385
§ 371 (c)(1),
(2), (4) Date: Nov. 28, 2007

(87) PCT Pub. No.: WO2006/051330
PCT Pub. Date: May 18, 2006

(65) Prior Publication Data
US 2008/0100627 A1    May 1, 2008

(30) Foreign Application Priority Data

Nov. 15, 2004  (GB) .................................. 0425204.5

(51) Int. Cl.
G06F 15/00  (2006.01)
G06T 1/00  (2006.01)
(52) U.S. Cl. ........................................ 345/501; 345/522
(58) Field of Classification Search .................. 345/501, 345/522
See application file for complete search history.

(56) References Cited

U.S. PATENT DOCUMENTS 6,252,677 B1  6/2001  Hawes et al.
6,384,833 B1  5/2002  Denneau et al.
6,433,788 B1 *  8/2002  Morein .......................... 345/557
6,738,069 B2 *  5/2004  Doyle ............................ 345/556
(Continued)

FOREIGN PATENT DOCUMENTS

EP      1 033 683 A2      9/2000
(Continued)

OTHER PUBLICATIONS

Translation of Chinese official action, Aug. 21, 2009, in corresponding Chinese Application No. 200580039002.0.
(Continued)

*Primary Examiner* — Daniel Washburn
(74) *Attorney, Agent, or Firm* — Nixon & Vanderhey P.C.

(57) ABSTRACT

A graphic rendering pipeline has a number of different rendering units and receives fragments for rendering. A renderer stated word cache is used to store rendering state data to be used to configure the rendering units when they render a fragment. Each rendering unit includes a functional block which carries out a rendering operation on a received fragment and a renderer state word interface that can be used to look up the required rendering state data from the renderer state word cache. Each fragment is provided to the rendering pipeline with fragment data that indicates, inter alia, a fragment index, a renderer state word index, and other fragment data that is necessary to render the fragment. When a rendering unit of the rendering pipeline receives a fragment to be rendered, it firstly uses the renderer state word index associated with the fragment to look-up, using its renderer state word interface, the relevant rendering state data from the renderer state word cache. It then uses that rendering state data to configure its functional block, and then renders the fragment.

28 Claims, 4 Drawing Sheets

U.S. PATENT DOCUMENTS

| | | | |
|---|---|---|---|
| 6,809,732 B2* | 10/2004 | Zatz et al. | 345/503 |
| 7,218,291 B2* | 5/2007 | Abdalla et al. | 345/24 |
| 7,542,042 B1* | 6/2009 | Allen et al. | 345/506 |
| 7,911,471 B1* | 3/2011 | Allen et al. | 345/522 |
| 2003/0002729 A1* | 1/2003 | Wittenbrink | 382/154 |
| 2003/0137518 A1 | 7/2003 | Hiwada et al. | |
| 2003/0164831 A1 | 9/2003 | Walls et al. | |
| 2004/0008200 A1 | 1/2004 | Naegle et al. | |
| 2004/0155884 A1 | 8/2004 | Baker et al. | |
| 2004/0160450 A1 | 8/2004 | Doyle | |
| 2004/0189650 A1 | 9/2004 | Deering | |
| 2007/0146380 A1* | 6/2007 | Nystad et al. | 345/582 |
| 2007/0195100 A1* | 8/2007 | Brown et al. | 345/502 |

FOREIGN PATENT DOCUMENTS

| | | |
|---|---|---|
| JP | 2000-251091 | 9/2000 |

OTHER PUBLICATIONS

Segal et al., The OpenGL Graphics System: A Specification (Version 2.0—Oct. 22, 2004), pp. 1-382.

Translation of Japanese Official Action, Apr. 13, 2010, in corresponding Japanese Application No. 2007-540720.

Nuydens: "State Management" Delphi3D-Rapid OpenGL Development, pp. 1-3, 'Online! XP002364522, Mar. 30, 2001.

United Kingdom Combined Search and Examination Report mailed Feb. 14, 2006 in corresponding Great Britain Application No. GB0523277.2.

International Search Report mailed Feb. 17, 2006 in corresponding International Application No. PCT/GB2005/004385.

Written Opinion of the International Searching Authority for International Application No. PCT/GB2005/004385 dated Feb. 17, 2006.

ATI Radeon 9700 PRO Preview, Brandon Bell, Aug. 19, 2002, pp. 1-44.

Nuydens, Tom, XP-002364522, Delphi3D, State Management, Rapid OpenGL Development, Mar. 30, 2001, pp. 1-3.

Segal et al., The OpenGL® Graphics System: A Specification (Version 2.0—Oct. 22, 2004).

Translation of Chinese official action, Dec. 23, 2011, in corresponding Chinese Application No. 200580039002.0.

* cited by examiner

PROCESSING OF 3-DIMENSIONAL GRAPHICS

This application is the U.S. national phase of International Application No. PCT/GB2005/004385 filed 15 Nov. 2005 which designated the U.S. and claims priority to GB 0425204.5 filed 15 Nov. 2004, the entire contents of each of which are hereby incorporated by reference.

The technology relates to the processing of 3-dimensional (3D) graphics for, e.g., display on a display screen, and in particular to the rendering of 3-dimensional graphics for display.

As is known in the art, 3D graphics processing is normally carried out by first splitting the scene to be displayed into a number of similar basic components (so-called "primitives") to allow the 3D graphics processing operations to be more easily carried out. These "primitives" are usually in the form of simple polygons, such as triangles, and are usually described by defining their vertices.

Once the scene to be displayed has been divided into a plurality of graphics primitives, the graphics primitives are usually then further divided, as is known in the art, into discrete graphical entities or elements, usually referred to as "fragments", on which the actual graphics processing operations (such as rendering operations) are carried out. Each such graphics fragment will represent and correspond to a given position in the primitive and comprise, in effect, a set of data (such as colour and depth values) for the position in question.

Each graphics fragment (data element) usually corresponds to a single pixel (picture element) in the final display (since as the pixels are the singularities in the final picture to be displayed, there will usually be a one-to-one mapping between the "fragments" the 3D graphics processor operates on and the pixels in the display). However, it can be the case that there is not a direct correspondence between "fragments" and "pixels", for example where particular forms of post-processing such as down-scaling are carried out on the rendered image prior to displaying the final image.

Thus two aspects of 3D graphics processing that are typically carried out are the "rasterising" of graphics "primitive" (or polygon) position data to graphics fragment position data (i.e. determining the (x, y) positions of the graphics fragments to be used to represent each primitive in the scene to be displayed), and then "rendering" the "rasterised" fragments (i.e. colouring, shading, etc., the fragments) for display on a display screen.

(In 3D graphics literature, the term "rasterisation" is sometimes used to mean both primitive conversion to fragments and rendering. However, herein "rasterisation" will be used to refer to converting primitive data to fragment addresses only.)

The rendering process basically involves deriving the data necessary to display each fragment. Such data typically comprises red, green and blue (RGB) colour values for each fragment (which will basically determine the colour of the fragment on the display), and a so-called "Alpha" (transparency) value for each fragment.

As is known in the art, this data is typically derived by carrying out individual rendering processes (steps) on each fragment (i.e. the data for that fragment) one after another in a linear or pipelined fashion. Thus, for example, each fragment is firstly allocated initial RGB and alpha values, based on, e.g., colour and transparency data recorded for the vertices of the primitive to which the fragment belongs, and then operations such as texturing, fogging, and blending, etc., are carried out on the fragment data in succession. These operations modify the initial RGB and alpha values set for each fragment, such that after the last processing operation, each fragment has an appropriate set of RGB and alpha values to allow that fragment to be displayed correctly on the display screen. This final set of RGB and alpha values is then stored ready for display of the fragment on the display screen. The process is then repeated for all the fragments in the scene area currently being rendered.

The rendering process is carried out in this fashion because the individual rendering operations are typically independent of each other, and can be carried out without reference to other rendering steps or fragments, such that they can be carried out in a linear, pipelined fashion without detriment. Carrying out the rendering operations in such a pipelined fashion (in a so-called "rendering pipeline"), means that the different rendering units of the "pipeline" can operate on different fragments at the same time, thereby making the rendering process more efficient.

To carry out the correct rendering operation, each stage of the rendering process needs to be configured appropriately, i.e. to be set to the correct so-called "rendering state". The rendering state determines how the stages of the rendering process operate on each fragment, and typically determines, for example, one or more of the antialiasing mode, blending mode, stencil buffer operation, texture function, texture map information, z-test mode, RGBa buffer write mode, etc., to be used for rendering the graphics fragments. It can also be used to, e.g., indicate the rasterising mode to be used.

The rendering state is typically determined and set by the "driver" software driving the graphic processor. (As is known in the art, a graphics processor will typically be controlled by a "master" device (e.g. on a host system of the graphics processor) that communicates with and controls the graphics processor by means of a software "driver" that runs on the master device and is configured to communicate with and control the graphics processor in response to commands received from (software) applications running on the master device that require use of the graphics processor.)

In existing 3D graphics processing systems, all the stages of the rendering process are usually first configured to the desired rendering state, and then graphics fragments issued for rendering. In other words, the entire renderer is configured to a single rendering state before graphics fragments are sent to it.

However, this means that when a fragment is to be rendered using a different rendering state to the current state of the renderer (e.g. when the first fragment from another primitive with a different rendering state is to be rendered), the renderer must have its rendering state changed to the new rendering state before the new fragment can be rendered. Furthermore, the rendering state of the render cannot be changed until the processing of all the fragments presently in the renderer has been finished. In practice this means that when a change in renderer state is needed, the new fragment requiring the new rendering state must be "stalled", the fragments already in the renderer "flushed" through it, and the rendering state changed, before the new fragment can be rendered. This degrades the performance of the renderer.

It is known therefore to try to reduce the number of rendering state changes that need to be made by sorting primitives to be rendered according to their rendering states prior to "issuing" them to the renderer. However, even with such sorting, rendering, state changes still tend to occur relatively frequently.

It is also known to try to increase the speed at which a rendering state change can be made, for example by including rendering state change commands and data in the primitive data stream supplied to the renderer, so as to, e.g., reduce the time required to effect the renderer state change. However, such operation still requires the renderer to be stalled and flushed whenever a rendering state change needs to be made.

The Applicants believe therefore that there remains scope for improvements to rendering operation, particularly in the context of rendering state changes.

According to a first aspect, there is provided a graphics processor, comprising:

a renderer for rendering graphics fragments for display and that comprises one or more rendering units that can be configured to different rendering states;

means for storing a plurality of sets of data, each set of data defining a different rendering state for configuring the rendering units of the renderer;

means for associating a graphics fragment to be rendered with one of the stored rendering state data sets; and means for issuing graphics fragments that have been associated with a stored rendering state data set to the rendering units of the renderer for rendering;

wherein:

one or more of the rendering units of the renderer comprise:

means for determining the rendering state data set associated with a graphics fragment to be rendered; and means for configuring the rendering unit in accordance with the determined rendering state data set.

According to a second aspect, there is provided a method of operating a graphics processor having a renderer including one or more rendering units for rendering graphics fragments for display, the method comprising:

storing data defining one or more rendering states for configuring the rendering units of the renderer;

associating each fragment to be rendered with one of the stored rendering states; and a rendering unit, when it receives a fragment to be rendered, determining the rendering state associated with that fragment, being configured in accordance with the determined rendering state, and carrying out its rendering operation on the received fragment.

Graphics fragments to be rendered are associated with their rendering state, and rendering units of the renderer then use that association to determine the rendering state that they should use for rendering the fragments. In other words, when a rendering unit receives a fragment for rendering, it "looks up" the rendering state to use for the fragment based on the rendering state that has been associated with the fragment, and then renders the fragment accordingly. This avoids the need to configure the entire renderer to a given rendering state before any fragments are rendered. It also means that the rendering units of the renderer can effectively each configure themselves to the rendering state required for their current fragment independently of the current rendering state or states of the remaining rendering units in the renderer.

An advantage of this arrangement is that different units of the renderer can be (and preferably are) configured to different rendering states at the same time, i.e. such that rendering units of the renderer can be operating on fragments that require different rendering states simultaneously. This accordingly allows fragments having different rendering states to be issued to (and rendered by) the renderer at the same time, without the need to reconfigure other or all units of the renderer to the new rendering state when a rendering state change occurs between successive fragments.

The technology described in this application can thus be used to reduce or even eliminate renderer stalls and flushes due to rendering state changes, thereby increasing the speed and efficiency of the rendering operation, and facilitating the use of longer (and more complex) renderers (that could otherwise become too inefficient to use if it was necessary to stall and flush them every time a rendering state change occurred). The ability to use longer and more complex renderers facilitates, for example, implementing more complex rendering operations, such as phong shading, even in "real-time" rendering processes.

Furthermore, because the technology described in this application can reduce the deleterious effects of rendering state changes, it can reduce or remove the need to pre-sort primitives and fragments according to their rendering state prior to rendering. This allows the primitives and fragments to be sorted according to other criteria prior to rendering, which can be advantageous. For example, the primitives could instead be (and preferably are) sorted according to depth.

The technology described in this application also extends to a rendering unit that can operate in the above manner, and to an apparatus for use with a renderer that can prepare graphics fragments appropriately.

Thus, according to a third aspect of the present invention, there is provided a rendering unit for use in a graphics processor, comprising:

means for determining the rendering state associated with a graphics fragment to be rendered; and means for configuring the rendering unit in accordance with the determined rendering state.

According to a fourth aspect, there is provided an apparatus for use in a graphics processor, comprising means for storing a plurality of sets of data, each set of data defining a different rendering state for configuring rendering units of a graphics processor;

means for associating graphics fragments to be rendered with one of the stored rendering state data sets; and means for issuing graphics fragments that have been associated with a stored rendering state data set to rendering units of a graphics processor for rendering.

The data sets that are used to define the rendering states should, as discussed above, contain the necessary configuration information for the rendering units of the renderer. Thus they preferably specify data such as the active texture map (e.g. the memory address where the texture map to be used is stored and the size of that texture map, as is known in the art) to be used, the texture function and blending mode to be used, the z-buffer and stencil-buffer mode to be used, and/or whether antialiasing is to be enabled, etc. They could also, if desired, include data for specifying other operations, such as rasterising, as is known in the art.

Where the graphics processor supports operations such as pixel shader programming (as is known in the art, some 3D graphics processors support the use of "pixel shader" programs, and can include, e.g., pixel shader processors that can be used to carry out more complex rendering operations, particularly on a per fragment basis), then the stored rendering state data sets can and preferably do include data indicating the pixel shading program(s) and data to be used. This data could, e.g., be in the form of data defining the memory address where the relevant shader program is to be retrieved from and the size of that program, and/or be in the form of a pointer to a stored pixel shader program that will be used to configure a or the pixel shader processor of the renderer.

The rendering state data sets are preferably generated by the driver software for the graphics processor. They are preferably specified on a per-primitive basis.

The rendering state data sets can be selected and arranged as desired. They could, e.g., be arranged as would normally be the case for defining rendering states for a renderer (e.g. rendering pipeline). In a preferred embodiment the data sets are arranged in predefined data structures, such that each data set has a common format. Most preferably the data sets defining the different rendering states are arranged as data words. In a particularly preferred embodiment each data set, e.g. renderer state word, is subdivided into plural discrete, smaller parts (e.g. subwords), each of which, e.g., define different aspects of the rendering state.

The rendering units of the renderer can be selected as desired. They preferably comprise one or more of the rendering units normally found in a renderer. Thus they preferably comprise one or more of, e.g., a function generator or generators, a texture mapper, a blender or blenders, a fogging unit or units, logic operations units, pixel shader unit(s), and one or more output buffers. There are preferably a plurality of rendering units in the renderer. Each rendering unit will, as is known in the art, render a graphics fragment it receives in accordance with the rendering state that the rendering unit is configured to.

In a preferred embodiment, each rendering unit of the renderer is able to determine and configure itself to the rendering state associated with a fragment. However, this is not essential, and thus in another preferred embodiment only some of the individual rendering units are able to perform a renderer state "look-up". For example, selected units of the renderer (such as all the blending units) could be grouped together and a single rendering state determination and configuration performed for the group of units together when a fragment is received at the first unit in the group.

While it would be possible for a rendering unit when it performs a renderer state look-up to retrieve (look-up) the entire rendering state data set for that rendering state, it is preferred for the rendering units to only look-up (retrieve) that part or parts of the rendering state data set that they actually need to be able to configure themselves to the desired rendering state. Thus the rendering units can preferably lookup or retrieve only a selected part of the rendering state data set, should they so wish. This reduces the amount of data needs to be retrieved by the rendering units when they receive a fragment for rendering.

Thus, it is accordingly preferred for different parts of the renderer state data sets to be able to be looked up independently of the need to look up or retrieve the entire data set, e.g., such that a rendering unit can, e.g., look up a sub-part of the appropriate rendering state data set without needing to retrieve the entire rendering state data set from memory.

The way that the graphics fragments are associated with a given rendering state data set can again be selected as desired. Most preferably each fragment is allocated a flag or index pointer that is "passed" through the renderer with the fragment and that indicates the renderer state data set to be used for that fragment. The rendering units can then use the renderer state data set flag or pointer of the fragment to retrieve the appropriate renderer state data from where it is stored. The renderer state data set flag or pointer is preferably associated with the other data for the fragment (such as its RGBa values) that "passes" through the renderer.

The flag or pointer could identify the actual rendering state data set to be used, but in a preferred embodiment, as will be discussed further below, does not do this but instead simply indicates (points to) the memory location where the data set is stored. This reduces the complexity of the flag or pointer, as it would not then need potentially to distinguish between all the possible rendering state data sets that could be used.

In a particularly preferred embodiment, primitives to be rendered are associated with (and flagged with) the rendering state data set to be used for rendering that primitive (since, typically, a given primitive will be rendered in its entirety using the same, single rendering state) and then, when the primitive is rasterised into fragments, each fragment is allocated the rendering data set pointer or flag allocated to the primitive. Thus, preferably, the rasterising step is used to associate the fragments with their corresponding rendering state data sets.

The way that the rendering state data sets for use by the rendering units of the renderer are stored can similarly be selected as desired. It is preferred that a plurality of such data sets are stored, as that facilitates the renderer rendering fragments having different rendering states at the same time.

However, the Applicants have also recognised that storing a large number of rendering state data sets all so as to be accessible by the rendering units simultaneously in use would require a relatively large, and slower, memory facility. Furthermore, the rendering state data set pointers or flags associated with each fragment would necessarily have to be sufficiently large so as to distinguish all the possible rendering states.

Thus in a particularly preferred embodiment, a more limited, selected number of the possible rendering state data sets to be used to render a scene are stored for access by the rendering units. These rendering state data sets are preferably stored "locally" to the renderer, preferably in a more rapidly accessible, local memory unit, such as a cache memory, associated with the renderer. This has the advantages that the rendering state data sets stored in the local memory unit may be more rapidly retrieved by the rendering units and that the rendering state data set pointers associated with each fragment can be shorter (as there are less data sets to distinguish between).

Thus the apparatus preferably further includes a local, preferably cache, memory, associated with the renderer and accessible by rendering units of the renderer in which one or more (and preferably a plurality of) rendering state data sets are stored. The rendering units are furthermore, preferably configured such that they look to retrieve the rendering state data sets from this local memory, rather than from another memory accessible to the rendering device.

The number of rendering state data sets that are stored for access by the rendering units in the, e.g., local cache, memory that the rendering units access can be selected as desired. As discussed above, the more such data sets that are stored, the more different rendering states that the renderer can handle simultaneously, and accordingly, the less likely a renderer stall due to a rendering state change will be. On the other hand, the more data sets that are stored, the larger the necessary memory and the more complex the system.

The number of data sets to store is preferably selected based on the length of the renderer, i.e. such that more rendering states are stored for larger renderers. For example, to ensure that stalls due to rendering state changes cannot occur, as many rendering state data sets as there are individually configurable rendering units (or groups of units that are configured in common) in the renderer should be stored.

The Applicants have found that storing data for four different rendering states will eliminate the occurrence of renderer stalling due to rendering state changes for most practical implementations of (relatively smaller) renderers. If eight or sixteen rendering states are stored, then the possibility of renderer stalls is reduced even further. Thus preferably 4 to 16, more preferably 4, 8 or 16, and most preferably 4, renderer state data sets are stored for access by the rendering units.

In an arrangement where a limited number of rendering state data sets are stored for access by the rendering units of the renderer, particularly where they are stored in a local memory of the renderer, it is preferred to store in another memory, such as an external memory, accessible to the renderer, more of (and preferably all of) the rendering state data sets that could or will be needed to render the scene in question, so that those data sets are available if necessary, for example, if the local, limited memory does not store the necessary data set. Most preferably, data sets can be copied to the more limited (local) memory (subject to its overall capacity) from the larger memory storing (all) the data sets, as they are required for rendering.

It is believed that such an arrangement may be new and advantageous in its own right. Thus, according to a fifth aspect, there is provided a method of operating a graphics processor that includes a renderer having one or more rendering units that can be configured to particular rendering states, the method comprising:

storing in a first memory means a plurality of data sets defining different rendering states to be used for rendering a scene to be rendered; and storing a selected number of the plurality of data sets in a second memory means that can be accessed by rendering units of the renderer.

According to a sixth aspect, there is provided a graphics processing system that includes a renderer having one or more rendering units that can be configured to particular rendering states, the system comprising:

a first memory means for storing a plurality of data sets defining different rendering states to be used for rendering a scene to be rendered; and a second memory means that can be accessed by rendering units of the renderer for storing a selected number of the plurality of data sets.

As discussed above, in these example aspects and example embodiments, it is preferred for the rendering units of the renderer only to access the memory storing the subset of the rendering state data sets.

Where only a limited number of rendering state data sets are stored so as to be accessible by the rendering units of the renderer then, as discussed above, it is possible that a fragment requiring a rendering state not currently accessible by the rendering units will need to be rendered. In that case, as discussed above, it is then preferred for that new rendering state to be writable to the memory that is accessible to the rendering units for use. However, the Applicants have recognised that fragments should preferably not be passed for rendering until the appropriate rendering state data set is available to the rendering units.

Thus, in a particularly preferred embodiment, fragments are only "issued" for rendering if the rendering state data set associated with the fragment is accessible to the rendering units (e.g. stored in the local memory of the renderer). In the event that the necessary rendering state data set is not available, then the processing of the fragment is preferably paused (stalled) until the relevant rendering state data set is available to the rendering units. (It should be noted here that although the processing of the fragment in question may be stalled, the processing of other fragments for which the necessary rendering state data is available can and preferably does continue. In other words, the rendering process (pipeline) is not stalled, only the fragment (primitive) in question is stalled.)

Since in practice, as discussed above, all fragments for a given primitive will have the same rendering state, this operation is preferably carried by determining whether the rendering state data set associated with the primitive is accessible to the rendering units (e.g. stored in the local memory of the renderer). If the rendering state data set is so-available the primitive can be issued for rasterisation to fragments and rendering. If not, the primitive is held back until the necessary rendering state data set is available.

This stalling of a fragment (primitive) should be contrasted with prior art systems in which the entire pipeline (i.e. the processing of all new fragments) is stalled; it is preferred that the processing of subsequent fragments (primitives) for which the appropriate rendering state data sets are accessible to the rendering units is continued with, even while the processing of one (or more) fragments (primitives) may be stalled.

Thus, in a particularly preferred embodiment, when a primitive (or fragment) is received for rendering, a check is first made to see if the required rendering state data set is stored in the (e.g. local) memory accessible to the rendering units of the renderer. If it is, then the primitive (fragment) can be passed to the renderer for processing as normal. If the rendering state data set is not stored in the memory, then processing of the primitive (or fragment) is stalled until such time as the appropriate rendering state data set is available in the memory accessible by the rendering units, at which time the primitive (fragment) can then be sent for rendering.

It is accordingly also preferred to be able to load new rendering state data sets into the memory accessible to the rendering units of the renderer as they are needed, for example, when a primitive or fragment requiring a new rendering state that is not already in the (local) memory is to be rendered. As discussed above, such loading of new rendering state data sets is preferably from an existing store of (all) the rendering state data sets that it is anticipated could be needed.

In such an arrangement, where there is spare capacity to store the new data set in the memory accessible to the rendering units, then the new data set can simply be loaded into the memory. However, if the memory's capacity for rendering state data sets is all in use, then the new data set will have to replace an existing stored rendering state data set.

In the latter case, where a new rendering state data set that is to be loaded into the (e.g. local) memory accessible to the rendering units is to replace an already stored rendering state data set, it is preferred not to replace an already stored rendering state data set until the existing rendering state data set is no longer needed for rendering (e.g. for fragments already in, or known to be going to be sent to, the renderer).

If it is not possible at the time to replace an existing stored data set then the system preferably continues to monitor the memory to determine when an existing stored rendering state data set is no longer needed and so can be replaced.

It is preferred therefore to include a step of or means for monitoring the use of rendering state data sets stored in the memory accessible to the rendering units, so to, e.g., be able to determine whether and when a rendering state data set already stored in the memory accessible to the rendering units is no longer in use or needed (and thus can be replaced). Most preferably such "use" is monitored by tracking the progress of fragments and/or primitives using the stored data sets through the renderer, preferably so as to determine, e.g., whether there are any fragments in the renderer, or expected to be sent to the renderer, that need or will need the data set in question. When it is determined that there are no such fragments, then the rendering state data set can be replaced.

It is again believed that such an arrangement may be new and advantageous in its own right. Thus, according to a seventh aspect, there is provided a method of operating a graphics renderer, comprising:

associating graphics fragments to be rendered with particular rendering states; and tracking the progress through the renderer of graphic fragments associated with a particular rendering state or states.

According to an eighth aspect, there is provided a graphics processor, comprising:

a renderer;

means for associating graphics fragments to be rendered with particular rendering states; and means for tracking the progress through the renderer of graphic fragments associated with a particular rendering state or states.

The tracking of the progress of fragments using each stored data set preferably includes at least determining when the last such fragment leaves the renderer, and determining whether any primitives using that data set are currently being rendered (as that will indicate whether fragments using the data set are about to be sent to the renderer).

In a particular preferred embodiment, the progress of the fragments, etc., using each stored rendering state data set is carried out by maintaining a series of counters that track the progress of the fragments and/or primitives.

Most preferably two counters in respect of each stored rendering state data set are maintained. The first counter, a primitive counter, is preferably incremented (or decremented) each time a primitive using the rendering state data set is sent to be rendered, and decremented (or incremented, respectively) each time the rasteriser issues the last fragment for a primitive using the particular rendering state data set. The second counter is a "fragment" counter and is incremented (or decremented) each time a fragment using the rendering state data set is issued to the renderer and decremented (or incremented, respectively) each time the rendering of a fragment using that rendering state data set is completed. When both counters are zero, that indicates that the rendering state data set is not currently in use and so can be replaced, if desired.

In a preferred embodiment, the apparatus includes a resource allocator that controls the storage (and replacement) of the rendering state data sets in the memory accessible to the rendering units, and the issuing of primitives for rasterising and fragments for rendering, as appropriate.

It would be possible to sort primitives by renderer state prior to rendering them, as is known in the art. That would further reduce the risk of a rendering stall due to a renderer state change occurring. However, as discussed above, an important advantage is that technology described in this application can be used to remove the need to sort the primitives by rendering state prior to rendering. Thus in a preferred embodiment, the primitives are sorted by another criteria (i.e. not by rendering state) prior to rendering. They are most preferably sorted by depth prior to rendering.

As will be appreciated from the above, links a given rendering state data set to each fragment to be rendered and the rendering units of the renderer configure themselves according to the rendering state linked to the fragments as they receive them. In other words, upon receipt of a fragment, a rendering unit will determine the required rendering state and configure itself to that rendering state prior to rendering the fragments.

Thus, according to a ninth aspect, there is provided a renderer for graphics processing in which graphics fragments for rendering are linked to respective stored rendering state data sets and rendering units of the renderer configure themselves according to the rendering state linked to the fragments as they receive them.

Furthermore, the technology described in this application allows rendering units of the renderer to be configured to different rendering states simultaneously, and for fragments requiring different rendering states to be issued to and present in the renderer at the same time.

Thus, according to a tenth aspect, there is provided a renderer for graphics processing in which rendering units of the renderer can be configured to different rendering states simultaneously.

The technology described in this application is applicable to any form or configuration of renderer, although as will be appreciated from the above, it is particularly applicable to renderers having a "pipelined" arrangement, in which case the renderer will be in the form of a rendering pipeline. It is applicable to all forms of rendering, such as immediate mode rendering, deferred mode rendering, tile-based rendering, etc.

As will be appreciated from the above, the technology described in this application is particularly applicable to 3D graphics processors and processing devices, and accordingly extends to a 3D graphics processor and a 3D graphics processing platform including the apparatus of or operated in accordance with any one or more of the aspects described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments can include, as appropriate, any one or more or all of the preferred and optional features described herein.

The methods may be implemented at least partially using software e.g. computer programs. Further aspects provide computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. A computer software carrier comprises software which when used to operate a graphics processor, renderer or microprocessor system comprising data processing means causes in conjunction with said data processing means said processor, renderer or system to carry out the steps of the methods described. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps need be carried out by computer software and thus the computer software and such software installed on a computer software carrier can carry out at least one of the steps of the methods set out herein.

The technology may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred, non-limiting, example embodiments will now be described by way of example only and with reference to the accompanying drawings, in which.

As discussed above, the technology described in this application relates to the rendering operation of 3D-graphics processors.

As is known in the art, when 3D-graphics objects are to be rendered, they are usually first defined as a series of primitives (polygons), which primitives are then divided into graphics fragments, which fragments are then rendered in turn. During a normal 3D rendering operation, the renderer will modify the (e.g.) RGBa data associated with each fragment so that the fragments can be displayed correctly. Once the fragments have fully traversed the renderer, then their associated data values are stored in memory, ready for display.

Each primitive is also typically associated with a rendering state which defines how the primitive is to be rasterised and rendered (for example the texture mode, blending mode, z-test, anti-aliasing, mode, etc., to be used to render fragments of the primitive). In the normal course, the rendering state for a given primitive is set by the software driver running on the host system that is using the 3D-graphics processor. This driver typically defines data sets that define the different rendering states, which data sets are then stored in such a way that they can be used to configure the rendering units of the renderer to the correct rendering state when desired.

Figure 1:
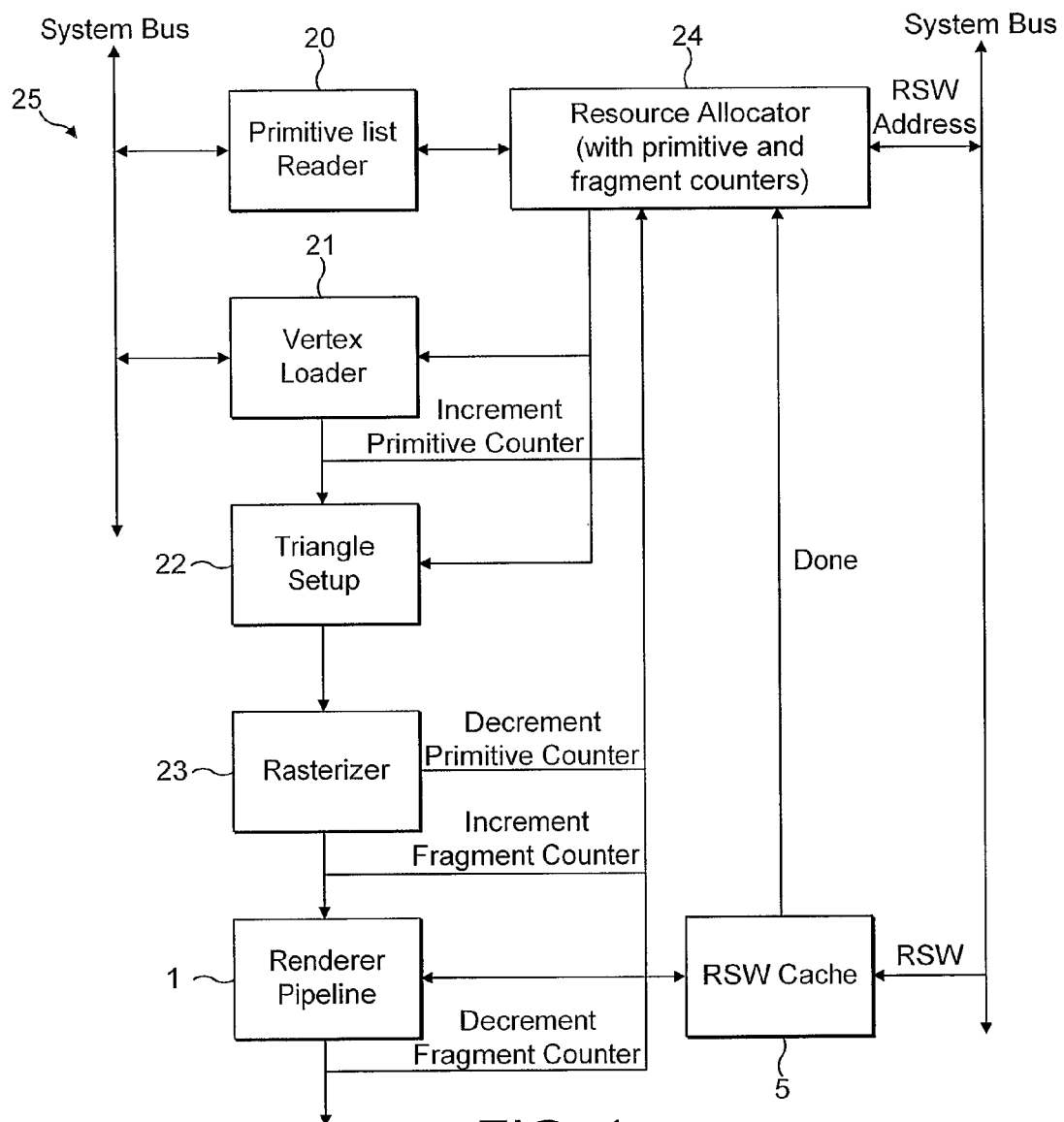
FIG. 1 shows schematically a 3D graphics processing system in accordance with an embodiment.
Figure 2:
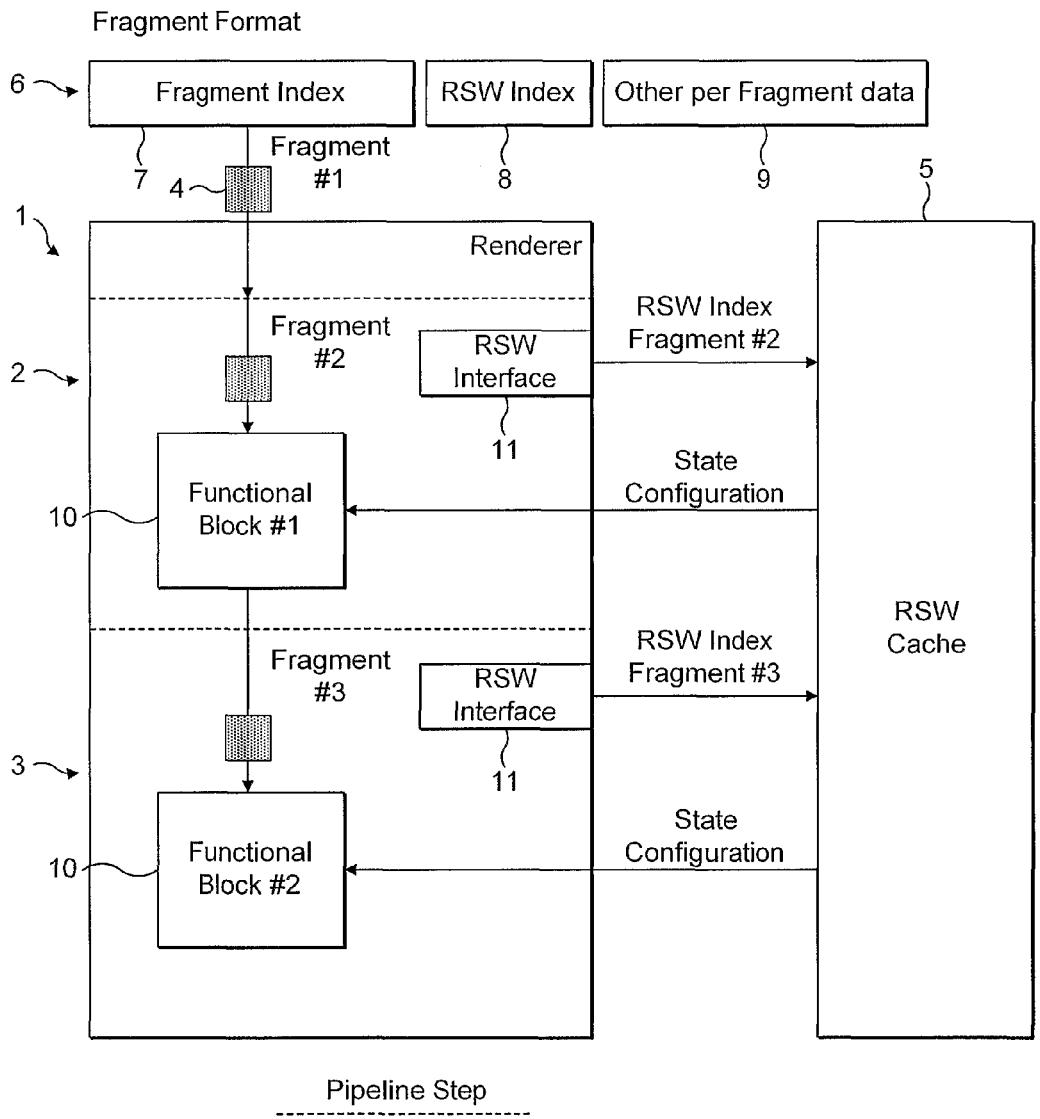
FIG. 2 shows schematically the operation of the 3D graphics renderer of the embodiment of FIG. 1.

FIGS. 1 and 2 show schematically an embodiment of a 3D graphics processing platform. FIG. 1 shows the overall graphics processor system. FIG. 2 shows the operation of the renderer (rendering pipeline) in more detail.

In this embodiment, each fragment to be rendered is associated with a given rendering state, and then the various rendering units of the renderer "look up" the rendering state for a fragment when they receive the fragment for rendering.

As shown in FIG. 1, the graphics processing system 25 includes a renderer in the form of a rendering pipeline 1 that receives fragments for rendering, and a cache memory 5 that stores data defining rendering states for access by rendering units of the rendering pipeline 1 to allow those units to configure themselves for rendering fragments (as will be discussed further below).

The graphics processing system also includes a number of other functional units that are typically present in 3D-graphics processing systems, such as a primitive list reader 20 (for reading primitive list elements which contain pointers to vertex, etc., data for primitives to be rendered (as is known in the art)), a vertex loader 21 (for fetching the vertex data pointed to by the pointer in the primitive lists read by the primitive list reader 20 (i.e. to determine the vertexes of the primitives when they are ready to be rasterised and rendered)), a triangle set-up unit 22 (for performing triangle set up on the primitive data received from the vertex loader 21), and a rasteriser 23 (for, as is known in the art, converting the primitive data to fragment positions for rendering the primitives).

The system shown in FIG. 1 also includes a resource allocator 24, which can communicate with the various units of the system and operates in particular to control the storing of renderer state data sets in the renderer state cache memory 5 and the issuing of primitives (and accordingly fragments) to the vertex loading, triangle set-up, rasterising and rendering pipeline stages of the system.

The cache memory 5 stores the data sets defining the different rendering states in the form of renderer state "words". Each renderer state word contains configuration information for the rendering pipeline 1, specifying data such as the active texture map, the texture function and blending mode to use, the z-buffer and stencil-buffer mode to use, and whether anti-aliasing is enabled. The renderer state "words" can also include data indicating the pixel shader programs (and data) to be used for a fragment or fragments.

In this embodiment, each renderer state word consists of 8 sub-words, each 32-bits wide, stored in consecutive memory. However, as will be appreciated by those skilled in the art, different arrangements could be used if desired.

The renderer state word cache 5 contains four registers or lines, each of which can store one renderer state word, i.e. such that the renderer state word cache 5 can at any one time store four different renderer state words. This enables fragments associated with any one of the four currently stored renderer state words to proceed through the rendering pipeline 1. (As will be appreciated by those skilled in the art, other numbers of renderer state word registers in the renderer state word cache 5 could be used, if desired.)

The renderer state words stored in the renderer state word cache 5 may be changed. This is done under the control of the resource allocator 24.

In order to control the storage and replacement of renderer state words in the renderer state word cache 5, the resource allocator 24 maintains two counters for each renderer state word register (line): a primitive counter and a fragment counter, to enable it to track the progress of fragments associated with a given renderer state word that is stored in the renderer state word cache 5.

The primitive counter is incremented each time a primitive that needs the corresponding renderer state word is, in effect, loaded into the system, and decremented each time the rasteriser 23 issues the last fragment for a primitive using that renderer state word. This is achieved as shown in FIG. 1 by the triangle set-up unit incrementing the primitive counter for the renderer state word tied to that primitive when it receives a primitive for set-up, and the rasteriser issuing a decrement polygon counter signal for the associated renderer state word to the resource allocator 24 when the last fragment from the primitive leaves the rasteriser 23.

The fragment counter operates in a similar manner, and is incremented by one for each fragment using the corresponding renderer state word that is issued to the rendering pipeline 1, and decremented by one each time a fragment using the rendering state word is completed. This is achieved by the rendering pipeline issuing an increment fragment counter signal for the associated renderer state word when a fragment enters the pipeline, and issuing a decrement signal when the fragment leaves the pipeline, as shown in FIG. 1.

The resource allocator 24 uses these counters to determine whether a renderer state word cache register line can be "unlocked" (i.e. the corresponding renderer state word can be replaced with a new renderer state word). When both the primitive counter and the fragment counter are zero (and a new polygon about to be rendered does not use that particular renderer state word (or, if the primitive list has ended, no current primitive exists), then the resource allocator 24 will "unlock" the renderer state word register for that particular renderer state word, such that, if necessary, that renderer state word can be overwritten with a new renderer state word that may be required. In this way, the resource allocator 24 ensures that a renderer state word already stored in the renderer state word cache 5 cannot be replaced until all the current fragments associated with that renderer state word have completed the rendering pipeline 1.

In operation of the present embodiment, when a scene is to be rendered, the driver software will, as is known in the art, prepare and store the necessary vertex data, etc., (the per-primitive data) for defining the primitives to be rendered. It will also generate and store the necessary rendering state data sets (renderer state words) for rendering the entire scene. The rendering state data sets can be generated and stored in any suitable manner. In a preferred arrangement, a record (e.g. list) of the rendering state data sets is maintained, preferably in software, as the rendering state data sets are generated so as to allow the driver software to determine whether the rendering state data set required for a primitive has already been generated for an earlier primitive. This helps to reduce or avoid the driver software unnecessarily generating several copies of the same rendering state data set.

Once the necessary data has been generated and stored, the driver software will then prepare appropriate primitive lists containing pointers to the stored vertex data, etc., for each primitive to be rendered for the scene (for retrieval by the primitive list reader 20 so as to allow the primitives to be rendered) as is known in the art.

The driver software also includes in the primitive lists pointers to the stored renderer state word data to be used for rendering each primitive, so as to link each primitive to the appropriate renderer state word (rendering state data) that is to be used to render it. (Although in this arrangement the rendering state data sets are accordingly specified on a per-primitive basis, this is not essential and other arrangements could be used if desired.)

It is preferred that all the primitive data and primitive lists, including the renderer state words, necessary to render the entire scene (or frame-part, e.g. tile) are prepared before primitives are issued for rendering, as that then avoids the need to revert to the driver software as the scene is being rendered. However, other arrangements could be used, if desired.

Once the primitive data and primitive lists have been set up and stored, the primitives can be rendered. The first step in this process is for the primitive list reader 20 to read the relevant primitive list elements (i.e. the vertex data and renderer state word pointers, etc.) for a primitive from the memory where they are stored. The primitive list reader 20 then transmits a request to the resource allocator 24 for triangle set up operation (i.e. such that the primitive can be rendered).

Upon receipt of such a request, the resource allocator 24 determines whether the renderer state word associated with the primitive in question is already stored in the renderer state word cache 5. If the required renderer state word is already stored in the cache 5, then the resource allocator 24 passes the primitive for triangle set up operation. (Thus, although the renderer state words are defined on a per-primitive basis, the system operates to cache renderer state words from one primitive to the next, where it is appropriate to do so.)

If, on the other hand, the resource allocator 24 finds when it receives the request for triangle set up operation from the primitive list reader 20 that the required renderer state word is not already stored in the renderer state word cache 5, it stalls the processing of the primitive until one of the renderer state word cache 5 registers (lines) is free, and then stores the relevant renderer state word in the renderer state word cache 5 and continues the processing of the primitive.

To do the latter operation, the resource allocator 24 determines whether and when there is spare capacity for a renderer state word in the renderer state word cache 5 (i.e. determines if at least one cache register is "unlocked"), using the primitive and fragment counters for each renderer state word register, as discussed above.

When it determines that there is a free register in the renderer state word cache 5, the resource allocator 24 fetches the new renderer state word from the memory where it is stored and loads it into the free renderer state word cache register.

Once the resource allocator 24 has determined that the relevant renderer state word for the primitive in question is stored in the renderer state word cache 5 (or has stored it in the renderer state word cache 5), it assigns to the primitive the appropriate renderer state word index (pointer) into the renderer state word cache 5 to allow the renderer state word stored in the renderer state word cache 5 for the primitive to be identified.

In the present embodiment, the renderer state word index that the resource allocator 24 associates with each primitive is simply a pointer to which of the renderer state word cache registers stores the required renderer state word. This index accordingly comprises a 2-bit index into the renderer state word cache 5 (since the cache 5 has four renderer state word registers). (Of course, for other sizes of renderer state word cache 5, other index arrangements could be used. It would also be possible for the renderer state word index to indicate the actual renderer state word to use, rather than simply point to the memory location (register) where it is stored, if desired.)

The primitive is then passed for triangle set up operation and rendering, and so proceeds through the system.

Thus the vertex loader 21 then fetches the vertex data pointed to by the pointer in the primitive list read by the primitive list reader 20, and the triangle set up stage 22 performs triangle set up on the primitive data.

The primitive is then passed to the rasteriser 23 for rasterising. The rasteriser 23, as is known in the art, converts the primitive data to fragment positions for rendering. The rasteriser 23 also associates with each fragment an index pointer indicating the renderer state word cache 5 register that stores the renderer state word associated with the fragment (which will be the same renderer state word as is associated with the primitive in the list elements read by the polygon list reader 20).

The rasterised fragments are then passed to the rendering pipeline 1 for rendering. As discussed above, as the fragments from the primitive are rendered, the renderer state word index of each fragment is used to perform a renderer state word look-up at each step in the rendering pipeline so that the rendering units of the rendering pipeline are configured to the appropriate rendering state.

Once a fragment has been rendered, it is passed to an appropriate memory, such as a tile buffer, for storage prior to display.

FIG. 2 shows the operation of the rendering pipeline 1 in more detail. As shown in FIG. 2, it has a number of different functional blocks or rendering units 2, 3 and receives fragments 4 for rendering. These rendering units 2, 3 can comprise any suitable such units, such as function generators, texture mappers, blenders, fogging units, etc., as is known in the art.

Each rendering unit 2, 3 of the rendering pipeline 1 includes both a functional block 10 which carries out the rendering operation on the received fragment (and thus needs to be configured to the appropriate rendering state), and a renderer state word interface 11 that can be used to look up the appropriate rendering state data from the renderer state word cache 5.

As shown in FIG. 2, each fragment is provided to the rendering pipeline 1 with fragment data 6 that indicates, inter alia, the fragment index, the renderer state word index, and any other fragment data that is necessary to render the fragment (which can be any suitable such data, such as RGBa values, as is known in the art).

As discussed above, the renderer state word index 8 is a 2-bit pointer that indicates which of the renderer state word registers in the renderer state word cache 5 stores the renderer state word that should be used to render the fragment in question.

When a rendering unit 2, 3 of the rendering pipeline 1 receives a fragment to be rendered, it firstly uses the renderer state word index 8 associated with the fragment 4 to look-up, using its renderer state word interface 11, the relevant rendering state data from the renderer state word cache 5. It then uses that data to configure its functional block 10, and then renders the fragment. In this embodiment, the functional units 10 only look-up and retrieve that part of the renderer state word that is relevant to their operation (although they could look up the entire renderer state word, if desired).

When the next fragment is received by the rendering unit, it again checks the renderer state word index 8 associated with that fragment, retrieves the relevant configuration data from the renderer state word cache 5, configures its functional block 10, and then renders the fragment, and so on.

In this way, the need to re-configure the entire rendering pipeline whenever a rendering state change occurs is avoided. Furthermore, it is possible for the rendering pipeline 1 to process fragments having different rendering states simultaneously (depending on the number of different renderer state words stored in the renderer state word cache 5).

It should be noted here that although, as shown in FIG. 2, additional hardware may be required to perform the renderer state "look-ups" each time a fragment is received, there is no additional cost in terms of the speed or efficiency of the rendering operation as compared to conventional rendering systems.

Figure 3:
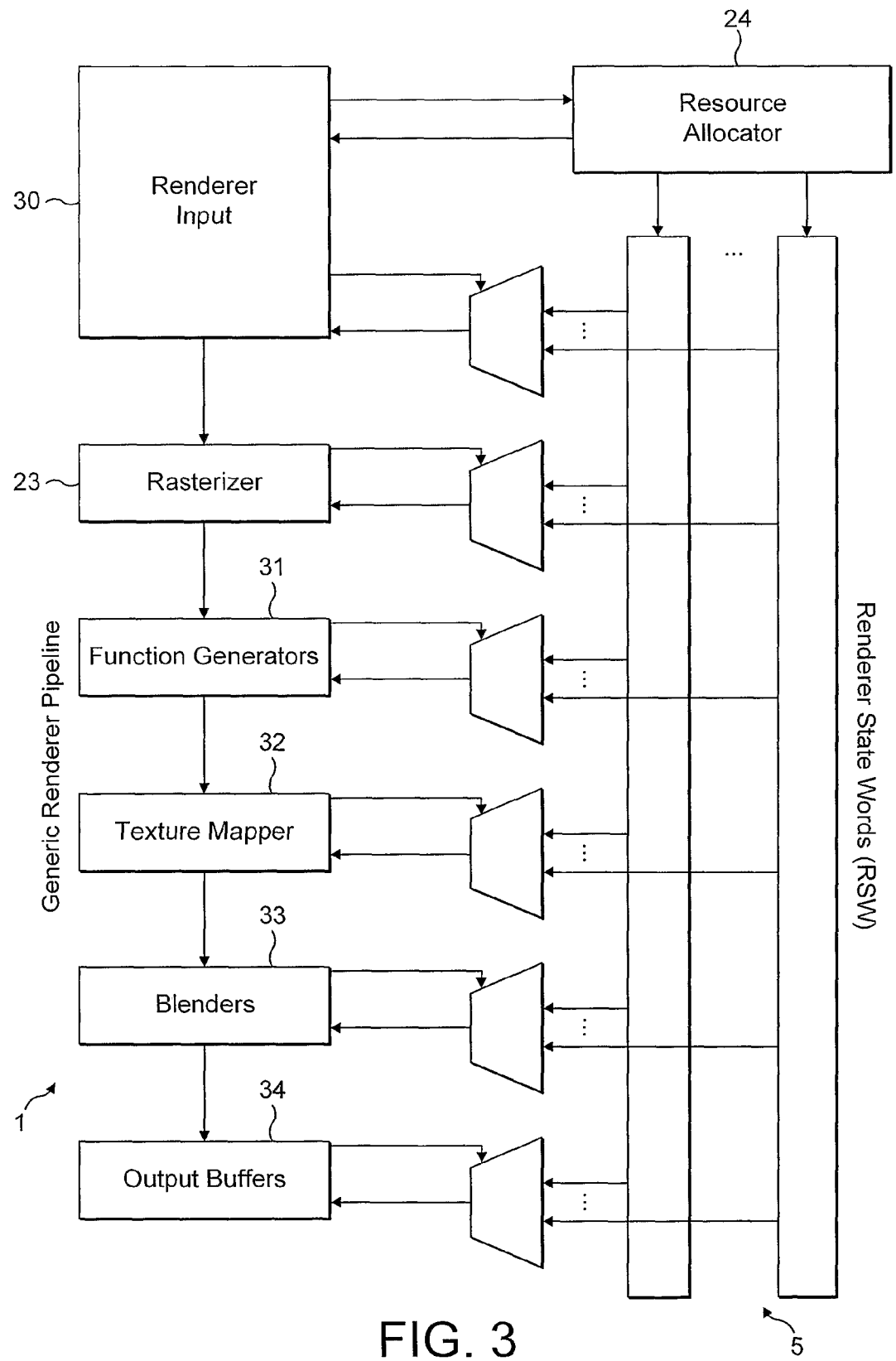
FIGS. 3 and 4 show another embodiment of a 3D graphics processing system.
Figure 4:
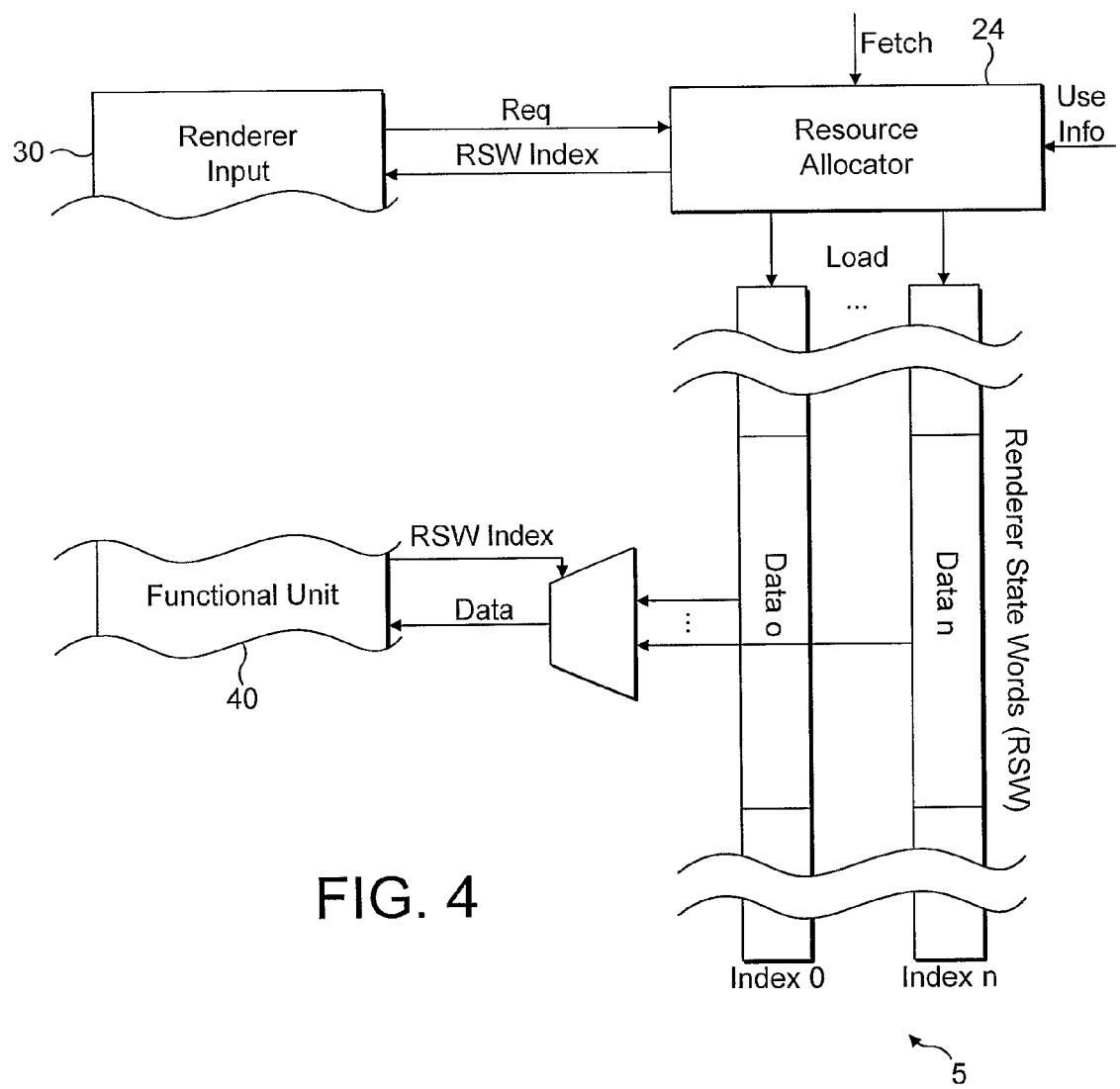

FIGS. 3 and 4 show another example of a 3D-graphics processing system.

FIG. 3 shows in particular the arrangement of the rendering pipeline 1 in more detail. As shown in FIG. 3, the graphics system again includes a resource allocator 24 that operates as discussed above in relation to FIG. 1, a renderer state word cache 5, which in this embodiment is shown as containing two renderer state word registers, a rasteriser 23 that operates as discussed above, and a number of rendering units in a rendering pipeline 1.

There is also shown schematically a renderer input stage 30, which basically, as discussed above, would receive the primitive list information, including the renderer state word data, and then provide the appropriate primitive data to the rasteriser 23 for rasterising.

The rasteriser 23 converts, as is known in the art, the graphics primitives provided to the renderer input stage 30 to graphics fragments. The rasteriser 23 uses the line segments determined by (or provided to) the renderer input stage 30 to produce a sequence of (x, y) coordinate pairs, each pair corresponding to the position of a graphics fragment to be used to render the primitive, for all the (x, y) positions covered by the primitive.

The next stage is one or more function generators 31, which, as is known in the art interpolate functions for rendering the graphics fragments, such as for setting and modifying their textures, colours, etc., using, inter alia, data associated with each vertex of the primitive being rendered, together with the x, y fragment positions determined by the rasteriser 23, to determine interpolation data necessary for rendering each fragment of the primitive. Such interpolated data is usually one or two of the following: texture map coordinates, primary colour, secondary colour and fog.

The rendering pipeline 1 then includes a texture mapper stage 32. This texture mapper 32, as is known in the art, retrieves texture map data from memory (not shown) and applies it to the graphics fragments passing down the rendering pipeline 1 in accordance with the determined texture coordinate data (s, t) for each graphics fragment. The texture mapper 32 can include a texture map cache memory in which texture map data can be stored for more rapid retrieval by the texture mapper 32.

The next stage is the blending stage 33. This stage, as is known in the art, takes as its inputs the colour value or values of a fragment from the rendering pipeline 1 (after shading and texture mapping of the fragment), and the corresponding colour value that resides in the output buffers 34 (see below) of the rendering pipeline for the corresponding fragment x, y position, and produces a blended version of the colour values of the two fragments.

The final stage of the rendering pipeline 1 is a set of output buffers 34, where the rendered graphics fragment data (i.e. the red, green, and blue data (and alpha data, if appropriate) values of each fragment) is stored prior to it being provided for display on a display screen. As is known in the art, in the case of tile-based rendering, the output buffers 34 will comprise one or more tile buffers. In the case of immediate mode rendering, the output buffers 34 will comprise one or more cache memories that store the graphics fragment data prior to display.

This 3D-graphics system is operated in the same manner as discussed above in relation to FIGS. 1 and 2.

Thus the renderer input 30 and rasteriser 23 operate to associate with each fragment to be rendered an index pointing to the appropriate renderer state word cache entry in the cache 5 (with the resource allocator 24, as discussed above, operating to check and ensure that the appropriate renderer state word is stored in the cache 5 before issuing the primitive for rendering). Then, as the fragments are rendered, the renderer state word index associated with each fragment is used by the rendering units of the rendering pipeline 1 to look up the appropriate renderer state word data from the renderer state word cache 5 and to configure the rendering units, so that the fragment can be rendered correctly.

This operation is shown schematically in more detail in FIG. 4, in which the various rendering units of the rendering pipeline 1 are shown as a generic functional unit 40.

Thus, a graphics renderer and rendering pipeline can be arranged to reduce or even avoid the need to stall the renderer when renderer state changes occur.

This is achieved in the preferred embodiments at least, by associating a rendering state index or pointer with each fragment in the renderer that follows the fragment through the renderer. A rendering state look-up is then performed at steps in the renderer so that the rendering units can be configured in use according to the particular rendering state for that particular fragment. In this way, fragments requiring different rendering states can be present in and processed by the renderer simultaneously, thereby avoiding the occurrence of "fragment bubbles" and pipeline blocking due to rendering state changes.

The technology described in this application avoids the need to stall and flush the renderer when a renderer state change occurs. This further means that it is no longer so necessary to sort primitives being supplied to the renderer by rendering state, such that, the primitives could be sorted by other criteria such as depth, etc., if desired.

There is also no need to notify the driver software of a change in the rendering state, such that the driver software complexity can be reduced.

Furthermore, the technology described in this application facilitates the use of longer renderers (rendering pipelines), since it can avoid and reduce the risk of the entire renderer blocking and stalling in use. This accordingly facilitates the use of more complex rendering operations, such as phong shading.

The invention claimed is:

1. A graphics processor, comprising:
   a renderer for rendering graphics fragments for display and that comprises one or more rendering units that can be configured to different rendering states;
   a memory for storing a plurality of sets of data, each set of data defining a different rendering state for configuring the rendering units of the renderer;
   a processor for associating a graphics fragment to be rendered with one of the stored rendering state data sets by including in data that represents the graphics fragment information that indicates the one stored rendering state data set to be used for the graphics fragment; and
   a processor for issuing graphics fragments that have been associated with a stored rendering state data set to the rendering units of the renderer for rendering;
   wherein:
   one or more of the rendering units of the renderer comprise:
   a processor for determining the rendering state data set associated with a graphics fragment to be rendered; and
   a processor for configuring the rendering unit in accordance with the determined rendering state data set,
   wherein the processor for determining the rendering state associated with a graphics fragment to be rendered is arranged to be responsive to one of the rendering units receiving a first graphics fragment to be rendered, to determine the rendering state associated with the first graphics fragment by using the information that indicates the stored rendering state data set to be used for the first graphics fragment included in the data that represents the first graphics fragment, to be responsive to the rendering unit receiving a next graphics fragment to be rendered, and to determine the rendering state associated with the next graphics fragment by using the information that indicates the stored rendering state data set to be used for the next graphics fragment included in the data that represents the next graphics fragment, and
   wherein the rendering state associated with the first graphics fragment is different from the rendering state associated with the next graphics fragment.

2. The processor of claim 1, wherein a rasterising step is used to associate a or the fragments with their corresponding rendering state data sets.

3. The processor of claim 1, comprising: a cache memory for storing one or more rendering state data sets associated with the renderer and accessible by rendering units of the renderer and wherein the rendering units of the renderer are configured such that they look to retrieve rendering state data from the cache memory.

4. The processor of claim 1, comprising:
   a first memory for storing a plurality of data sets defining different rendering states to be used for rendering; and
   a second memory that can be accessed by rendering units of the renderer for storing a selected number of the plurality of rendering state data sets.

5. The processor of claim 1, comprising:
   a processor for, when a primitive is received for rendering, checking if the required rendering state data set is stored in a memory accessible by rendering units of the renderer; and
   a processor for, if the required rendering state data set is not so-stored, stalling the processing of the primitive until such time as the appropriate rendering state data set is available in the memory accessible by the rendering units.

6. The processor of claim 1, comprising:
   a processor for monitoring the use of rendering state data sets by rendering units of the renderer.

7. The processor of claim 1, comprising a processor for tracking the progress through the renderer of graphic fragments associated with a particular rendering state or states.

8. The processor of claim 1, comprising: a resource allocator for controlling the storage of rendering state data sets in a memory accessible to the rendering units, and for controlling the issuing of primitives for rasterising and of fragments for rendering.

9. The processor of claim 1, comprising a processor for sorting primitives by a criterion other than their rendering state prior to rendering.

10. An apparatus for use in a graphics processor, comprising:
    a memory for storing a plurality of sets of data, each set of data defining a different rendering state for configuring rendering units of a graphics processor;
    a processor for associating graphics fragments to be rendered with one of the stored rendering state data sets by including in the data that represents a graphics fragment to be rendered information that indicates the stored rendering state data set to be used for the respective fragment, which information can then be used by a rendering unit of the graphics processor to retrieve the stored rendering state data set for the respective fragment when the rendering unit is to render the fragment; and
    a processor for issuing graphics fragments that have been associated with a stored rendering state data set to rendering units of a graphics processor for rendering.

11. The processor of claim 10, wherein the processor for associating a graphics fragment with a rendering state data set comprises a processor for allocating to a fragment a flag that indicates the rendering state data set to be used for the fragment.

12. A rendering unit of a graphics processor, comprising:
    a processor for determining the rendering state associated with a graphics fragment to be rendered by using information that indicates the rendering state to be used for the graphics fragment included in the data that represents the graphics fragment; and
    a processor for configuring the rendering unit in accordance with the determined rendering state for the graphics fragment to be rendered independently of the current rendering state of any other rendering unit of the graphics processor.

13. The processor of claim 12, wherein one or more of the rendering units can selectively retrieve only a part of a rendering state data set.

14. A method of operating a graphics processor having a renderer including one or more rendering units for rendering graphics fragments for display, the method comprising:
    storing data defining different rendering states for configuring the rendering units of the renderer;
    associating each fragment to be rendered with one of the stored rendering states by including in the data that represents a fragment information that indicates the stored rendering state data set to be used for the fragment; and
    a rendering unit, when it receives a fragment to be rendered, determining the rendering state associated with that fragment by using the information that indicates the stored rendering state to be used for the fragment included in the data that represents the fragment, being configured in accordance with the determined rendering state, retrieving rendering state configuration data for the determined rendering state from memory, and carrying out its rendering operation on the received fragment in accordance with the determined rendering state associated with that fragment.

15. The method of claim 14, comprising: using a rasterising step to associate a or the fragments with their corresponding rendering state data sets.

16. The method of claim 14, comprising: storing one or more rendering state data sets in a cache memory associated with the renderer and accessible by rendering units of the renderer; and the rendering units of the renderer retrieving rendering state data from the cache memory.

17. The method of claim 14, comprising:
    storing in a first memory a plurality of data sets defining different rendering states to be used for rendering; and
    storing a selected number of the plurality of rendering state data sets in a second memory that can be accessed by rendering units of the renderer.

18. The method of claim 14, comprising:
    when a primitive is received for rendering, checking if the required rendering state data set is stored in a memory accessible by rendering units of the renderer; and
    if the required rendering state data set is not so-stored, stalling the processing of the primitive until such time as the appropriate rendering state data set is available in the memory accessible by the rendering units.

19. The method of claim 14, comprising:
    monitoring the use of rendering state data sets by rendering units of the renderer.

20. The method of claim 14, comprising:
    tracking the progress through the renderer of graphic fragments associated with a particular rendering state or states.

21. The method of claim 14, comprising:
    sorting primitives by a criterion other than their rendering state prior to rendering.

22. A method of operating a graphics processor, comprising:
    storing a plurality of sets of data, each set of data defining a different rendering state for configuring rendering units of the graphics processor;
    associating graphics fragments to be rendered with one of the stored rendering state data sets by including in the data that represents a graphics fragment to be rendered information that indicates the stored rendering state data set to be used for the respective fragment and which information is associated with other data for the fragment and will pass through one or more rendering units of the graphics processor that is to render the fragment; and
    issuing graphics fragments that have been associated with a stored rendering state data set to rendering units of the graphics processor for rendering.

23. The method of claim 22, wherein the step of associating a graphics fragment with a rendering state data set comprises:
    allocating to a fragment a flag that indicates the rendering state data set to be used for the fragment.

24. A method of operating a rendering unit of a graphics processor, comprising:
    the rendering unit:
    determining the rendering state associated with a graphics fragment to be rendered by using information that indicates the rendering state to be used for the graphics fragment included in the data that represents the graphics fragment; and
    configuring itself in accordance with the determined rendering state for the graphic fragment to be rendered independently of the current rendering state of any other rendering unit of the graphics processor.

25. The method of claim 24, comprising:
    the rendering unit selectively retrieving only a part of a rendering state data set.

26. A non-transitory computer-readable medium encoded with a computer program comprising computer software code portions for performing the method of claim 14 when the computer program is run on a data processor.

27. A non-transitory computer-readable medium encoded with a computer program comprising computer software code portions for performing the method of claim 22 when the computer program is run on a data processor.

28. A non-transitory computer-readable medium encoded with a computer program comprising computer software code portions for performing the method of claim 24 when the computer program is run on a data processor.

* * * * *